(12) United States Patent
Haga et al.

(10) Patent No.: US 7,385,740 B2
(45) Date of Patent: *Jun. 10, 2008

(54) HOLOGRAM RECORDING MEDIUM

(75) Inventors: Koichi Haga, Ashigarakami-gun (JP); Kazuhiro Hayashi, Ashigarakami-gun (JP); Katsunori Kawano, Ashigarakami-gun (JP); Hisae Yoshizawa, Ashigarakami-gun (JP); Jiro Minabe, Ashigarakami-gun (JP); Yasuhiro Ogasawara, Ashigarakami-gun (JP); Shin Yasuda, Ashigarakami-gun (JP); Norie Matsui, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 61 days.

This patent is subject to a terminal disclaimer.

(21) Appl. No.: 11/204,990

(22) Filed: Aug. 17, 2005

(65) Prior Publication Data

US 2006/0215243 A1 Sep. 28, 2006

(30) Foreign Application Priority Data

Mar. 28, 2005 (JP) ............................... 2005-092627

(51) Int. Cl.
*G03H 1/02* (2006.01)
*G03H 1/04* (2006.01)
*G11B 7/24* (2006.01)

(52) U.S. Cl. ..................... 359/3; 430/1; 369/275.5
(58) Field of Classification Search ............. 359/1–4; 430/1, 2; 369/275.5, 283, 286
See application file for complete search history.

(56) References Cited

U.S. PATENT DOCUMENTS

| 4,856,857 | A |   | 8/1989  | Takeuchi et al. |
|-----------|---|---|---------|-----------------|
| 4,889,366 | A |   | 12/1989 | Fabbiani |
| 4,920,359 | A | * | 4/1990  | Arai et al. ............... 346/137 |
| 5,856,414 | A |   | 1/1999  | Hatke et al. |
| 6,506,468 | B1| * | 1/2003  | Morii et al. ............... 428/40.2 |
| 6,580,481 | B2| * | 6/2003  | Ueda et al. ............... 349/115 |
| 6,924,018 | B2|   | 8/2005  | Ozawa et al. |
| 7,126,755 | B2|   | 10/2006 | Moon et al. |
| 2006/0133256 | A1 | * | 6/2006 | Kinoshita et al. ........... 369/125 |
| 2006/0203315 | A1 | * | 9/2006 | Haga et al. .................. 359/12 |

FOREIGN PATENT DOCUMENTS

JP  A 10-340479   12/1998
JP  A 2000-67203   3/2000

OTHER PUBLICATIONS

"ID Card "Holoca" with Hologram Memory," http://www.fujixerox.co.jp/research/category/inbt/m_photonics/docs/holoca.pdf, with abstract.

* cited by examiner

*Primary Examiner*—Alessandro Amari
(74) *Attorney, Agent, or Firm*—Oliff & Berridge, PLC

(57) ABSTRACT

There is provided a hologram recording medium having: a recording layer at which a hologram can be recorded by illumination of writing light; and a protective layer provided on the recording layer in order to protect the recording layer, a water absorbency of the protective layer being less than or equal to 0.01%.

18 Claims, 6 Drawing Sheets

TEN-POINT AVERAGE ROUGHNESS OF SURFACE Rz =
$1/N [(H_1 + H_2 ... H_N) - (L_1 + L_2 ... L_N)]$

HOLOGRAM RECORDING MEDIUM

CROSS-REFERENCE TO RELATED APPLICATION

This application claims priority under 35 USC 119 from Japanese Patent Application No. 2005-92627, the disclosure of which is incorporated by reference herein.

BACKGROUND OF THE INVENTION

1. Field of the Invention

The present invention relates to a hologram recording medium, and in particular, to a hologram recording medium at which a hologram can be recorded by illumination of light.

2. Description of the Related Art

Conventionally, a rainbow hologram is added to a plastic card, such as a credit card, for purposes such as preventing counterfeiting, determining the genuineness of the card, and the like. A large amount of rainbow holograms are reproduced from an original plate, and therefore, all are the same image hologram. In recent years, a non-contact type IC card, in which a rainbow hologram is added thereto, such as, for example, "FeliCa®" developed by Sony Corporation, has become popular. Further, IC cards carrying an optical memory have also been proposed (Japanese Patent Application Laid-Open (JP-A) No. 2000-67203).

On the other hand, the present inventors have invented a recording/playback method in which a hologram is recorded on a recording medium in which a recording layer is formed on a non-optical-quality sheet member such as paper, a plastic card, or the like, and the recorded hologram is played-back at a high S/N ratio. Further, by applying this technology, the present applicant has developed a plastic card carrying a hologram memory, in order to strengthen the ID function and security function (http://www.fujixerox-.co.jp/research/category/inbt/m_photonics/docs/holo-ca.pdf).

A hologram memory can carry arbitrary information, which can be written-in on demand. Therefore, biometric information for authentication, such as a fingerprint or an iris or the like, and digital information such as text or a video or the like, can be held as a hologram, and use as a multi-purpose memory is also anticipated. Further, as the form of the hologram to be written, there are image holograms which can be perceived by the naked eye, and Fourier-transformed holograms which are read mechanically by the illumination of laser light or the like.

However, a hologram recording medium, which is recordable but is not yet recorded (i.e., a raw hologram card), has the problem that the raw storability thereof is poor. Generally, a recording medium, on which information is recorded by the illumination of light, has poor raw storability. For example, a recording medium, which uses a photosensitive material such as a silver halide or the like, is stored in a state in which light is blocked therefrom. In the case of a raw hologram card, a clear image cannot be obtained by recording and playback of the hologram merely by storing the raw hologram card in a state of being shielded from light.

SUMMARY OF THE INVENTION

The present invention has been developed in view of the aforementioned and provides a hologram recording medium having excellent raw storability.

As a result of diligent studies, the present inventors have found that the raw storability of a hologram recording medium is greatly affected by the water absorbency of the film used in the protective layer, and arrived at the present invention.

Namely, the hologram recording medium of the present invention has: a recording layer at which a hologram can be recorded by illumination of writing light; and a protective layer provided on the recording layer in order to protect the recording layer, a water absorbency of the protective layer being less than or equal to 0.01%.

Although the reason is not clear, in the hologram recording medium of the present invention, by making the water absorbency of the protective layer which protects the recording layer be less than or equal to 0.01%, the raw storability of the hologram recording medium is markedly improved. Namely, even after the hologram recording medium is stored over a long period of time as is in an unrecorded state, a clear image can be obtained by recording/playback of the hologram.

BRIEF DESCRIPTION OF THE DRAWINGS

An embodiment of the present invention will be described in detail based on the following figures, wherein.

DETAILED DESCRIPTION OF THE INVENTION

Hereinafter, an example of an embodiment of the present invention will be described in detail with reference to the drawings.

Hologram Card

Figure 1:
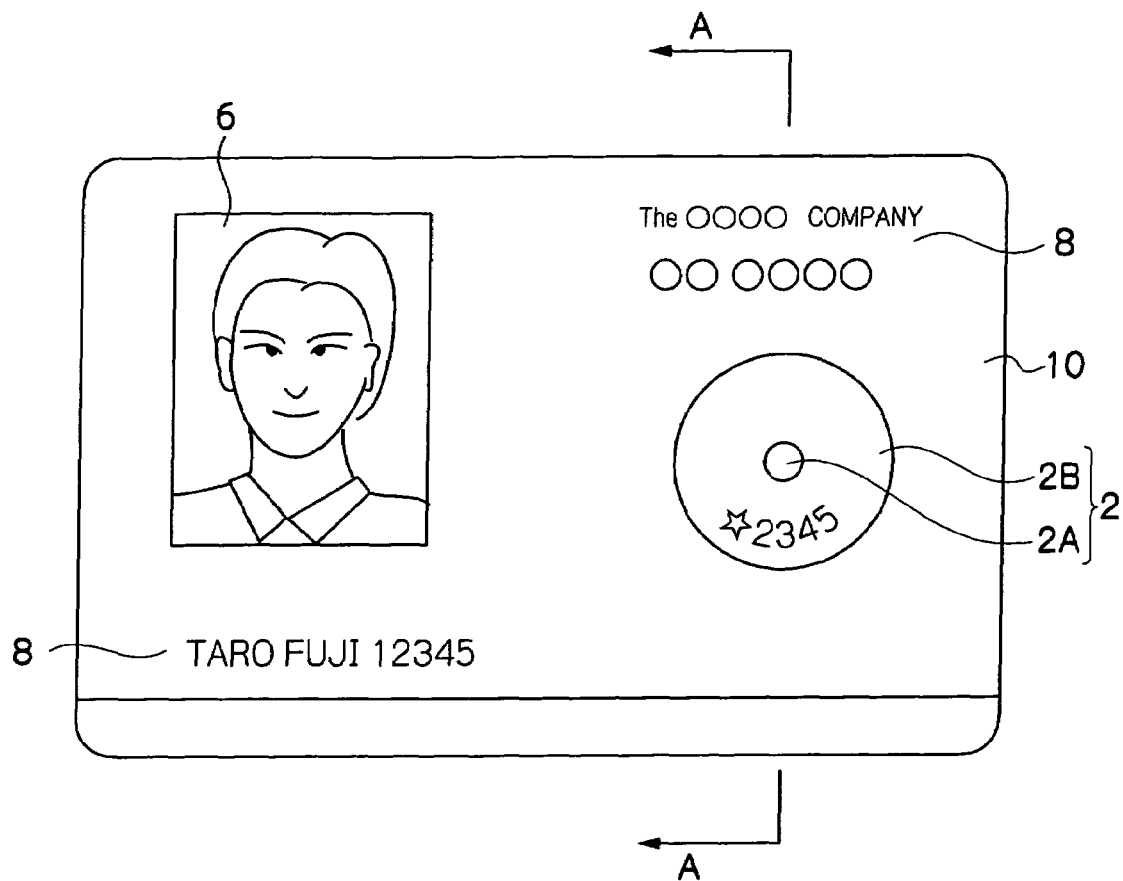
FIG. 1 is a plan view of a hologram card relating to an embodiment.

FIG. 1 is a plan view of a hologram card relating to the present embodiment. This hologram card is structured by a plastic card 10, and a hologram memory 2 which is fit-into a circular, concave portion (concave portion 10A which will be described later) of the plastic card 10. The surface roughness of the plastic card 10 is generally greater than or equal to 1 μm, and the plastic card 10 is non-optical-quality. Further, in the present embodiment, a photograph image 6 and a character image 8 are printed in advance on the surface of the plastic card 10.

A Fourier region 2A, in which a Fourier-transformed hologram is recorded, is provided at the central portion of the hologram memory 2. An image region 2B, at which an image hologram is recorded in advance, is provided at the periphery of the Fourier region 2A. By recording holograms in the Fourier region 2A and the image region 2B respectively, on-demand information can be promptly provided, and the hologram card can be promptly issued on demand.

Figure 2:
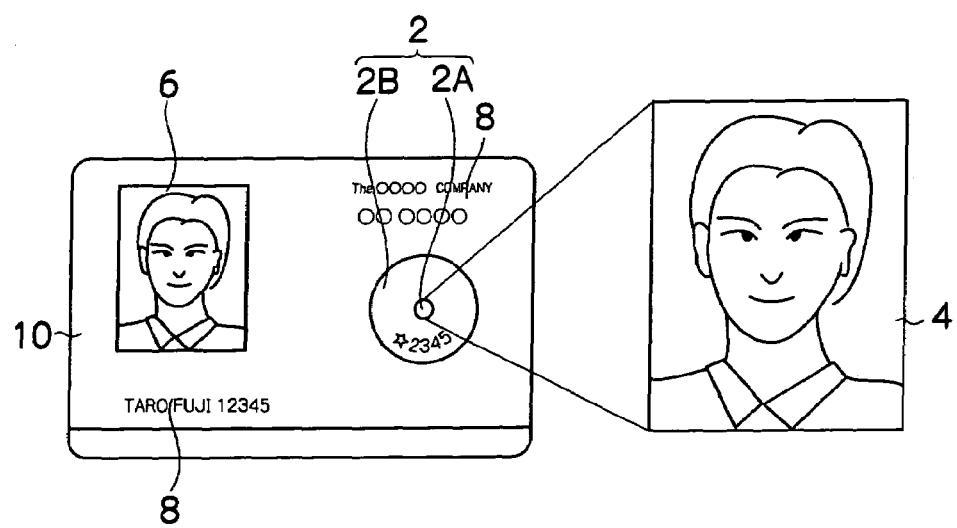
FIG. 2 is a diagram showing an example of a method of using a Fourier region.

For example, as shown in FIG. 2, in the Fourier region 2A, a Fourier image of a face image 4 can be recorded on the basis of the data image of the printed photograph image 6. In this way, by recording, in the Fourier region 2A of the hologram memory 2, information relating to the information which is added to the plastic card 10, the ID function can be strengthened by the both information acting in concert with one another. Further, other than the face image 4, biometric data, such as a fingerprint or an iris or the like, may be recorded in the Fourier region 2A.

Figure 3:
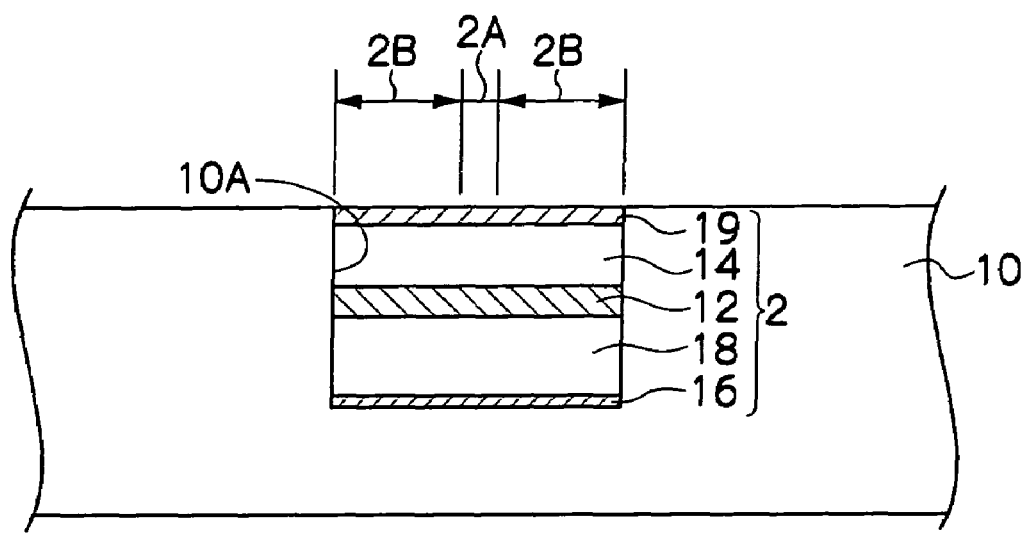
FIG. 3 is a cross-sectional view taken along line A-A of the hologram card shown in FIG. 1.

FIG. 3 is a cross-sectional view taken along line A-A of the hologram card shown in FIG. 1. The hologram memory 2 is fit into the recess portion 10A of the plastic card 10 such that the both are substantially flush with one another, and is fixed to the floor portion of the recess portion 10A by an adhesive layer 16. Double-sided tape which is tacky, or the like is used as the adhesive layer 16.

The hologram memory 2 has a hologram recording layer 12 at which the hologram is recorded, a protective layer 14 protecting the hologram recording layer 12, and a reflecting layer 18 reflecting diffracted light which is diffracted by the recorded hologram. The hologram recording layer 12 is formed on the reflecting layer 18, and the protective layer 14 is formed on the hologram recording layer 12. Further, an AR coating, which serves as a reflection preventing film 19, is formed on the surface of the protective layer 14 which is exposed from the plastic card 10.

The hologram recording layer 12 is not particularly limited provided that it is a recording layer at which a hologram can be written. An inorganic or organic hologram recording material can be used as the material structuring the recording layer. In the present invention, it is particularly preferable to use, from among such materials, organic hologram recording materials from the standpoints of the ability to manufacture the hologram recording medium, and that flexibility can be imparted to the hologram recording medium, and the like.

For example, photopolymers such as "OmniDex®" manufactured by DuPont or the like, as well as polymer materials having a photo induced refractive index change, and polarization sensitive materials such as azopolymers, a representative example of which is a polyester having cyanoazobenzene in the side chain (see JP-A No. 10-340479), and the like are used as the organic hologram recording material. Polarization sensitive materials exhibit a photoinduced refractive index change or photoinduced dichroism and maintain these characteristics at normal temperature. Therefore, these materials are preferable because a recorded hologram can be erased by the illumination of light and a new hologram can be recorded, i.e., the hologram is rewritable.

From the standpoint of improving security, it is particularly preferable to use a photopolymer which is recordable only one time. In this case, if the information of the issuing source and the card owner is recorded as a hologram at the time when the card is issued, it is difficult to counterfeit the card because rewriting of the hologram is not possible at the photopolymer.

From the standpoint of preventing bulkiness, the thickness of the hologram recording layer 12 is preferably in the range of 0.1 µm to 200 µm, and in order to increase the diffraction efficiency, a range of 10 µm to 30 µm is more preferable. In a case in which the hologram recorded on the hologram recording layer is a thin hologram (i.e., comparing the grating pitch of the hologram, a case in which a film thickness L of the recording layer is thinner or the same level), the film thickness is preferably in the range of 3 µm to 100 µm, and more preferably in the range of 5 µm to 20 µm. Further, in the case of a volume hologram (i.e., comparing the grating pitch of the hologram, a case in which the film thickness L of the recording layer is from the same level to several times or more), the film thickness is preferably in a range of 100 µm to 2 mm, and more preferably within a range of 250 µm to 1 mm.

The protective layer 14 is structured from a resin film which is flexible and which is transparent with respect to the laser light used in recording and playback. The water absorbency of the protective layer 14, i.e., the resin film structuring the protective layer 14, is less than or equal to 0.01%. By making the water absorbency of the resin film be less than or equal to 0.01% in this way, the raw storability of the hologram memory markedly improves. The "water absorbency (%)" is a value measured in accordance with ASTM D570. Examples of resin films which exhibit such a characteristic are polyethylene, polypropylene, and cycloolefin polymers (COP). Among these, COP, which have excellent optical characteristics such as transmittance, haze value, and the like, are preferable.

From the standpoint of preventing bulkiness, the thickness of the protective layer 14 is preferably in the range of 1 µm to 200 µm, and within this range, the thinner the better. It is preferable that the transmittance, with respect to the light used for recording and playback, of the resin film structuring the protective layer 14 is 85% or more, and 90% or more is more preferable. The transmittance is measured in accordance with JIS K7361-1 by using a haze meter (a reflectance-transmittance meter manufactured by Murakami Color Research Laboratory KK).

The haze value (the degree of haze) of the resin film is preferably 3% or less, and 1% or less is more preferable. The haze value is a value which expresses, in percentage terms, the scattering transmittance divided by the entire light ray transmittance (scattering transmittance÷entire light ray transmittance×100), and can be measured by the aforementioned haze meter. The haze value is an index of the transparence, and the smaller the haze value, the better the transparence.

In the structure shown in FIG. 3, the surface at the side opposite the hologram recording layer 12 is subjected to AR coating or the like, such that the reflection preventing film 19 is provided. The reflection preventing film 19 is not indispensable, but it is preferable to provide the reflection preventing film 19 in order to prevent the writing of unnecessary holograms due to the reflection at the surface of the protective layer 14 at the time of recording the hologram.

The reflecting layer 18 is structured by forming, on a substrate such as a flexible resin film or the like, a thin film which is formed from a light reflecting material whose reflectance with respect to the laser light used for recording and playback is greater than or equal to 70%. Namely, the reflecting layer 18 is structured by a resin film and a light reflecting material.

In addition to resin films such as polyethylene terephthalate (PET), polycarbonate (PC), tetraacetyl cellulose (TAC) and the like, engineering plastic films such as polyethersulphone (PES), polyetherimide (PEI), polysulphone (PSF), COP, and the like can be used as the resin film of the reflecting layer 18. Among these, PET, PES, PEI, PSF, and COP, which have excellent solvent resistance, are preferable.

Examples of the light reflecting material include metals and metal compounds of Al, Ti, Fe, Co, Ni, Cu, Ag, Au, Ge, Cr, Mg, Sb, Pb, Pd, Cd, Bi, Sn, Se, In, Ga, Rb, and the like, as well as glass and the like. Among these, Cr, Ni, Pt, Cu. Ag, Au, Al, and stainless steel are preferable, and Al is particularly preferable. A single one of these light reflecting materials can be used, or a combination of two or more types may be used.

The reflecting layer 18 can be formed by depositing, sputtering, ion plating, plating, or the like the above light reflecting material onto a film of polyester resin or the like. For example, a PET film on which Al is deposited, or the like can be used as the reflecting layer 18. From the standpoints of the ability to follow along the surface of the base layer such as the plastic card 10 or the like, and the avoiding of deformation during the manufacturing process, the thickness of the resin film is preferable in the range of 10 μm to 200 μm, and a range of 50 μm to 150 μm is more preferable. The thickness of the thin film formed from the light reflecting material is desirably 10 to 10,000 angstroms, and 20 to 2,000 angstroms is preferable.

Figure 8A:
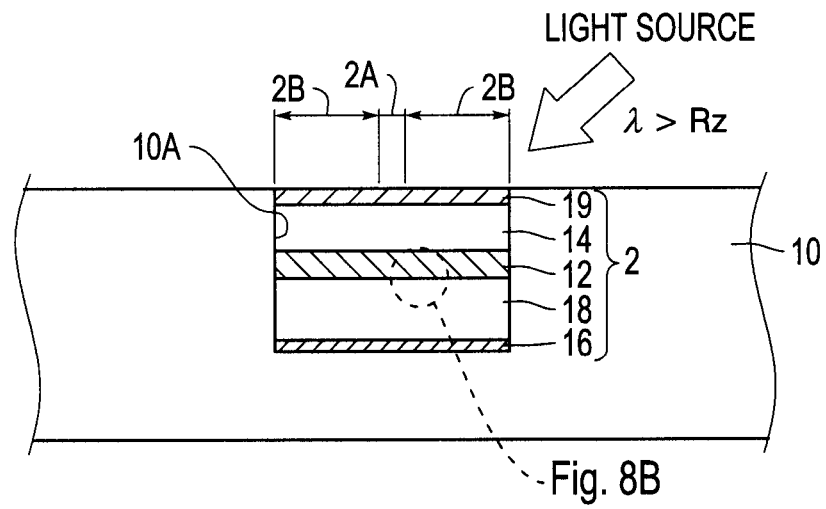
FIG. 8A is a cross-sectional view taken along line A-A of the hologram card shown in FIG. 1 with a portion highland showing the ten-point average roughness of a surface Rz.
Figure 8B:
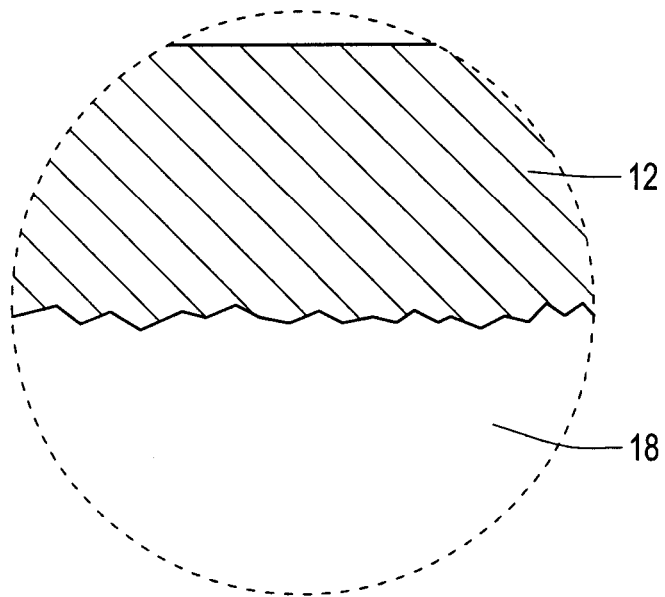
FIG. 8B is a close-up of the portion highlighted in FIG. 8A showing the ten-point average roughness of a surface Rz.

The characteristics of the surface of the resin film, on which the thin film made of the light reflecting material is formed, are extremely important. FIGS. 8A and 8B show how a ten-point average roughness Rz of the surface which contacts the hologram recording layer 12 is preferably smaller than the wavelength of the reading light, and is preferably ½ or less of the wavelength of the reading light.

If the light reflecting layer 18 is a reflecting layer in which the ten-point average roughness Rz of the surface contacting the hologram recording layer 12 is smaller than the wavelength of the reading light, scattering of light due to the indentations of the surface of the light reflecting layer 18 can be suppressed, and the hologram can be played-back without deterioration of the image. On the other hand, with an Rz which is of the same magnitude as the wavelength of the reading light, deterioration to the extent that the light reflecting layer cannot be used at all arises. Namely, even in the case of a plastic card at which the substrate is flexible, if the Rz value of the light reflecting layer 18 is in a range which is less than or equal to the wavelength, good recording and playback of the hologram are possible.

Further, it is preferable that the ten-point average roughness Rz is smaller than the wavelength of the writing light. By making the ten-point average roughness Rz smaller than the wavelength of the writing light, even at the time of recording the hologram, the scattering of light by the indentations of the surface of the reflecting layer 18 is suppressed, and the hologram can be recorded highly accurately. For example, in a case in which the wavelength of the writing light is 532 nm and the wavelength of the reading light is 640 nm, it is preferable that the ten-point average roughness Rz be less than or equal to 300 nm.

The ten-point average roughness Rz is an average value with respect to continuous values of Rti computed at the evaluation length. Rti is the distance, in the vertical direction, between the highest value and the lowest value of the profile existing in the sampling length. Therefore, as shown by the following formula, Rz is the average value of the values at which there is the greatest distance between peak and valley.

$$R_Z = \frac{1}{N}[(H_1 + H_2 + \ldots H_N) - (L_1 + L_2 + \ldots L_N)]$$

Here, Hi is the position of the highest value found during analysis, and Li is the position of the lowest value.

Note that the ten-point average roughness Rz can be measured by a three-dimensional surface configuration roughness measuring device manufactured by Veeco Instruments.

Method of Manufacturing Hologram Card

A method of manufacturing the above-described hologram card will be described next.

Figure 4A:
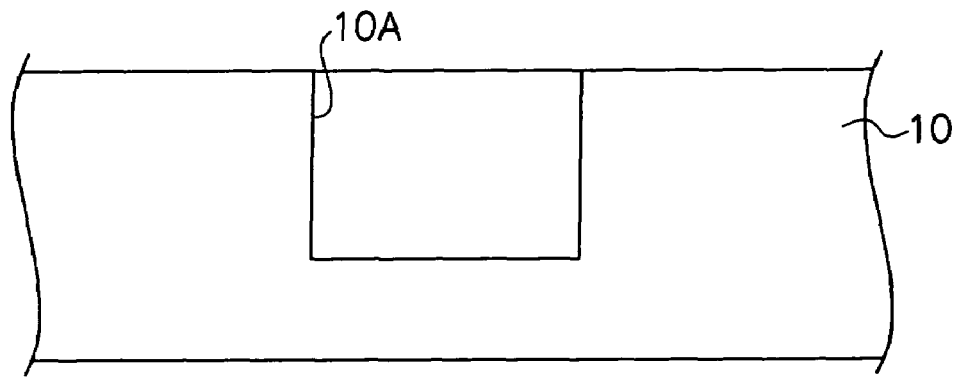
FIGS. 4A through 4D are process diagrams showing processes of manufacturing the hologram card.

FIGS. 4A through 4D are process diagrams showing processes for manufacturing the hologram card. First, as shown in FIG. 4A, the non-optical-quality plastic sheet 10, in which the recess portion 10A is formed, is readied. The recess portion 10A can be formed by cutting or the like.

Figure 4B:
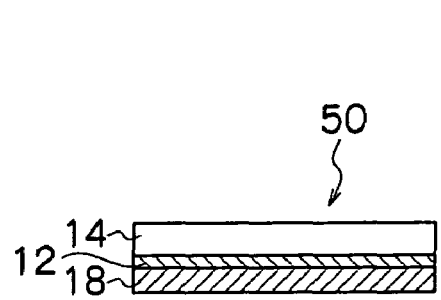

Next, a three-layer-structure sheet 50 shown in FIG. 4B is produced. A hologram recording material is coated on a flexible resin film, such that the hologram recording layer 12 is formed on the protective layer 14. Next, the reflecting layer 18 is formed, with the hologram recording layer 12 nipped between the reflecting layer 18 and the protective layer 14, by a resin film, on which metal has been deposited, being press-bonded to the flexible resin film. In this way, the three-layer-structure sheet 50, in which the hologram recording layer 12 and the protective layer 14 are layered on the reflecting layer 18, is produced.

Figure 4C:
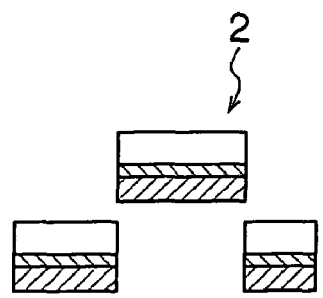
Figure 4D:
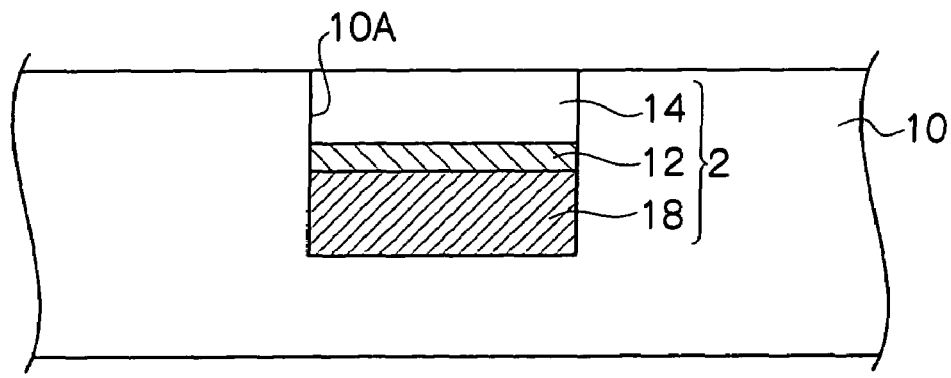

Next, as shown in FIG. 4C, the three-layer-structure sheet 50 is punched-out in the form of a circle, such that the portion corresponding to the hologram memory 2 is formed. Then, as shown in FIG. 4D, when the sheet piece which has been punched-out is, via an adhesive, fit-into the concave portion 10A formed in the plastic card 10, the hologram card 10 shown in FIG. 1 and FIG. 3 is completed.

Note that the three-layer-structure sheet 50 can also be manufactured as follows: a hologram recording material is coated on a resin film on which a metal is deposited such that the hologram recording layer 12 is formed on the reflecting layer 18, and next, a flexible resin film is press-bonded such that the protective layer 14 is formed on the recording layer 12.

Recording/Playback of Hologram

Figure 5:
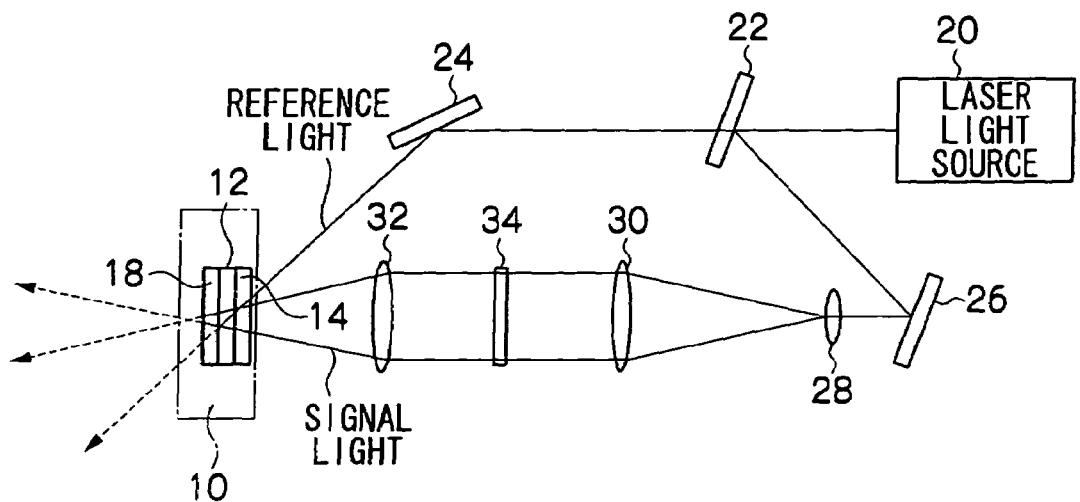
FIG. 5 is a schematic diagram showing the structure of a recording device for recording a hologram.

A recording device for recording a hologram is shown in FIG. 5. This recording device has a laser light source 20. Laser light, which is coherent light, is emitted and illuminated from the laser light source 20. A polarization beam splitter 22, which divides the laser light into light for reference light and light for signal light, is disposed at the laser light illuminating side of the laser light source 20.

A reflecting mirror 24, which reflects the laser light for reference light and changes the optical path to the direction of the hologram recording layer 12, is disposed at the light transmitting side of the polarization beam splitter 22. The reflecting mirror 24 illuminates the reflected laser light as reference light onto the hologram recording layer 12. A reflecting mirror 26, which reflects the laser light for signal light at a predetermined reflecting angle and changes the optical path to the direction of the hologram recording layer 12, and a lens system, which is structured by lenses 28, 30, 32, are disposed in that order at the light reflecting side of the polarization beam splitter 22.

A transmitting-type spatial light modulating element 34 is disposed between the lens 30 and the lens 32. The spatial light modulating element 34 is structured by a liquid crystal display element or the like, and modulates the laser light for signal light in accordance with a recording signal supplied from a control section (not illustrated), and generates signal light for recording a hologram. The lenses 28, 30 collimate the laser light into a large-diameter beam and illuminate the beam onto the spatial light modulating element 34. The lens 32 collects the signal light which is modulated by and transmitted through the spatial light modulating element 34.

At this time, the signal light is collected so as to focus at a position which is apart from the light exiting side surface of the hologram recording layer 12. The Fourier-transformed signal light and the reference light are simultaneously illuminated from the same side onto the hologram recording layer 12 which is added to the plastic card 10. The transmitting-type Fourier-transformed hologram is thereby recorded.

Figure 6:
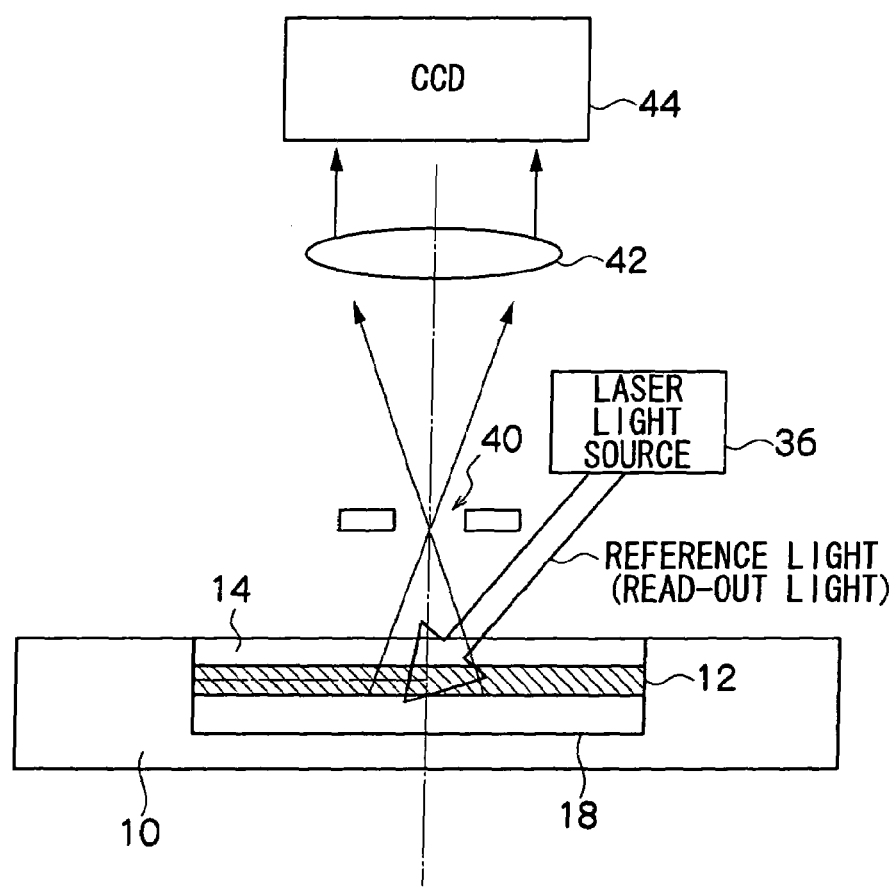
FIG. 6 is a schematic diagram showing the structure of a playback device for playing-back a hologram.

Next, the method of playing-back the recorded hologram will be described. A playback device for playing-back the hologram is illustrated in FIG. 6. This playback device has a laser light source 36. Laser light, which is coherent light, is emitted from the laser light source 36, and is illuminated as reference light (reading light) onto the hologram recording layer 12 added to the plastic card 10. An aperture 40, a lens 42, and a detector 44, which is structured by an image pickup element such as a CCD or the like, are disposed at the playback light exiting side of the hologram recording layer 12. The detector 44 is connected to the control section (not shown).

When the reading light is illuminated onto the hologram recording layer 12, the reference light is diffracted by the recorded, transmitting-type hologram, and signal light is played-back. By making the ten-point average thickness Rz of the surface of the reflecting layer 18 which surface contacts the hologram recording layer 12 be smaller than the wavelength of the reading light, scattering of light is suppressed, and the recorded hologram is played-back at a high S/N ratio.

At this time, a portion of the reference light is scatter-reflected at the surface of the plastic card 10. However, because the aperture 40 is disposed at the position at which the playback light is focused, the playback light passes through the aperture 40, but the scattered light is blocked. The playback light which passes through the aperture 40 is collimated by the lens 42, and is received by the detector 44. The received playback light is converted into an electric signal by the detector 44, and is inputted to the control section (not shown).

The wavelength of the reading light may be different from the wavelength of the reference light which is used at the time of recording. The reading light is preferably light of a wavelength which is longer than the wavelength of the reference light used at the time of recording. Long-wavelength laser light sources are inexpensive.

It is preferable to make the aperture 40 be of a size which is such that the low-order components of the Fourier-transformed image of the playback light are selectively transmitted therethrough. Concretely, if the aperture 40 is a size which selectively passes the zero-order and first-order components of the Fourier-transformed image of the playback light, the signal light can be played-back without errors. In order to obtain a good S/N ratio, the aperture 40 is preferably of a size which selectively transmits the components from the zero-order to the second-order of the Fourier-transformed image of the playback light, and is more preferably of a size which selectively transmits the components from the zero-order to the third-order.

When a data image is recorded as a hologram, the Fraunhofer diffraction image of the data image is recorded by the lens. The Fraunhofer diffraction image is proportional to the Fourier transformation of the amplitude distribution of the data image, and therefore, the recorded hologram is called a Fourier-transformed hologram. The Fourier-transformed image includes many spatial frequency components which are derived from the pixel pitch of the data image. Accordingly, even if the high-order components are cut from the playback light, the data image can be played back. Further, for the same reason, even if some of the components are absent due to scratches on the surfaces of the hologram recording layer 12 or the protective layer 14, the data image can be played-back.

As described above, in the present embodiment, a transmitting-type hologram is recorded on a hologram recording layer added to a plastic card, and the hologram is played-back. By making the water absorbency of the protective layer which protects the hologram recording layer be 0.01% or less, the raw storability of the hologram recording medium markedly improves, and even after the hologram recording medium is stored for a long period of time as is in an un-recorded state, a clear image can be obtained by recording and playback of the hologram.

Further, by using a cycloolefin polymer, which has excellent solvent resistance, at the protective layer, the haze of the protective layer does not deteriorate due to the solvent which leaks out from the photopolymer used at the hologram recording layer, and the raw storability of the hologram recording medium is further improved.

Modified Example

In the above embodiment, description is given of a plastic card which carries the hologram memory. However, it suffices for the hologram recording medium of the present invention to have a structure in which the recording layer is protected by a protective layer having a water absorbency of less than or equal to 0.01%, and the form of the hologram recording medium is not particularly limited. Further, the non-optical-quality sheet member is not limited to a plastic card.

The non-optical-quality sheet member is a sheet member having a so-called optically rough surface. From the time of being formed as an information holding body, the surface of the sheet member has a maximum surface roughness which is greater than or equal to ½ of the wavelength of the playback light, and/or has undulations such as flexing/swelling or the like which are greater than or equal to ½ of the wavelength at the illuminated region of the playback light. Or, the non-optical-quality sheet member is a member which, even though the surface thereof is initially an optical-quality surface, as the usage time passes, undulations such as bending, concaving, flexing, or the like are formed at the surface of the sheet member, such that the sheet member becomes non-optical-quality.

Other than paper, the material of the sheet member may be metal (aluminum or the like), plastic, ceramic (alumina or the like), or the like. The non-optical-quality sheet member includes, in addition to regular paper and coated paper, OHP sheets, plastic cards, and the like. For example, the surface roughness of regular paper is around 8 to 13 µm, and the surface roughness of a plastic card is greater than or equal to 1 µm.

In the present invention, by recording, in the hologram memory, information relating to the information which is added to the plastic card, the ID function and the security function are strengthened by the both information working in concert with one another. Accordingly, concretely, securities, passports, insurance polices, licenses, ADs (accreditations (official certificates)), CDs, DVDs, semiconductor memory media and the like, which require good security such as the effect of preventing counterfeiting and the like, can be considered to be used as the sheet member.

Further, the above embodiment describes an example in which information is added to a plastic card by printing a photograph image and character image on the plastic card. However, information can be added by embedding an IC or the like in the plastic card. In a case in which a non-contact-type IC is embedded, the film thickness of the reflecting layer must be adjusted in order not to hamper transmission and reception of the antenna, and in the case of an Al thin film for example, the film thickness is preferably less than or equal to 200 nm.

EXAMPLES

Next, the present invention will be described in further detail by using concrete Examples. However, the present invention is not to be limited by the following Examples.

Example 1

Production of Hologram Card

Aluminum is deposited to a thickness of 100 nm on a 100 μm thick cycloolefin polymer film ("Zeonor® ZF14" manufactured by Zeon Corporation, water absorbency: 0.01% or less, transmittance: 92%, haze: 0.1%, refractive index: 1.53), such that an Al deposited film for a reflecting layer is obtained. The ten-point average roughness Rz of the obtained Al deposited film at the Al deposited surface is measured by using a three-dimensional surface configuration roughness measuring device manufactured by Veeco Instruments, and Rz is found to be 64.6 nm.

Using the aforementioned cycloolefin polymer film as a protective layer, a liquid photopolymer (manufactured by Nippon Paint Co., Ltd.) serving as a hologram recording material is coated on the surface of this film by using a gap coater of 120 μm. After coating, drying is carried out, the solvent is sent flying, and a hologram recording layer of a thickness of 30 μm is formed. Then, the aforementioned Al deposited film is superposed and press-bonded on the surface at which the hologram recording layer is formed, such that the Al deposited surface of the Al deposited film contacts the surface at which the hologram recording layer is formed, and a three-layer-structure sheet of a thickness of about 230 μm is obtained.

"Zeonor® ZF14" is immersed in a solvent contained in a photopolymer, and when the haze values before and after the immersion are compared, it is found that the solvent resistance is excellent, with the haze value not varying and being 0.1% before immersion and 0.1% after immersion. Evaluation of the solvent resistance is carried out in accordance with the following criteria.

| | |
|---|---|
| change in haze is less than 0.2% | A |
| haze increased by 0.2% or more | B |
| haze increased by 1% or more | C |

A circular recess portion (of a depth of about 230 μm) of a size about that of a coin is formed in a commercially-available plastic card made of vinyl chloride. The aforementioned three-layer-structure sheet is punched-out in the same shape as the recess portion, and the punched-out sheet piece is fit into the recess portion of the plastic card as a hologram memory so as to be flush. In this way, a card sample A relating to Example 1 is obtained.

Recording/Playback of Hologram

A data image is actually hologram-recorded onto the card sample A, which is produced by the above-described method and of the above-described structure, and evaluation of the playback image is carried out. By using the hologram recording device of the structure shown in FIG. 5, a second harmonic of a YAG laser whose emission wavelength is 532 nm is used as the laser light source 20 for recording. A liquid crystal panel for a projector is used as the spatial light modulating element 34. A lens having a focal length of 50 mm is used as the Fourier-transforming lens 32.

Figure 7A:
FIG. 7A is a view showing a data image to be recorded.

The card sample A is set at the hologram recording device, and the data image shown in FIG. 7A is manifested at the spatial light modulating element 34. The polarized lights of the signal light and the reference light are properly arranged with S polarized light which is orthogonal to the paper surface, the signal light and the reference light are illuminated from the same side, and a usual, intensity-modulated hologram is recorded at the hologram memory. As the exposure conditions, the laser intensity and the exposure time are adjusted so that the total exposure amount is about 100 mJ/cm$^2$. The recording region is substantially 5 mm Φ.

Figure 7B:
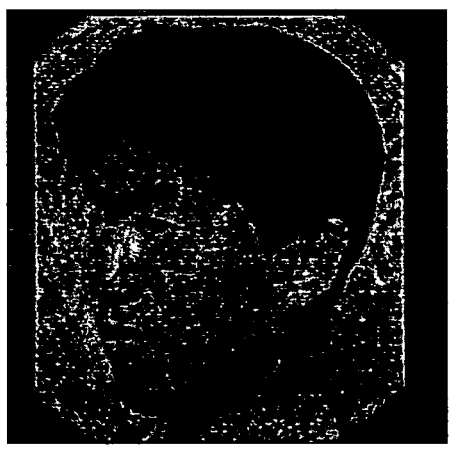
FIGS. 7B and 7C are views showing playback images.

Next, by using the playback device shown in FIG. 6, a semiconductor laser whose emission wavelength is 640 nm is used as the laser light source 36 for playback, and the aperture size is made to be 1 mm ϕ. The recorded card sample A is set at the hologram playback device such that the angle formed by the normal line of the hologram and the optical axis of the reference light is 45°, and playback of the hologram is carried out. The playback image detected at the CCD 44 is shown in FIG. 7B. As shown in the drawing, a clear Fourier image is played-back.

Evaluation of the recorded/played-back image is carried out in accordance with the following criteria. The results are shown in Table 1.

| | |
|---|---|
| a clear image is played-back | A |
| a somewhat blurry image is played-back | B |
| an image in which the original image can not be recognized is played-back | C |

Raw Storability Test

The card sample A, which is unrecorded, is forcibly stored for a period of about one month in a light-shielded box under the environmental conditions of 25 to 35° C. and 60 to 85% RH. After the forced storage, recording and playback are carried out in the same way as described above, and when the playback image is evaluated, it is found that a clear Fourier image is played-back without changing from before storage. The results are shown in Table 1.

TABLE 1

|  | refractive index (%) | transmittance (%) | haze (%) | solvent resistance | water absorbency (%) | image quality before forced storage | image quality after forced storage |
|---|---|---|---|---|---|---|---|
| Ex. 1 | 1.53 | 92 | 0.1 | A | 0.01 | A | A |
| Ex. 2 | 1.53 | 93.7 | 0.1 | A | 0.01 | A | A |
| Comp. Ex. 1 | 1.6 | 90.2 | 1.7 | A | 0.3-0.4 | B | C |
| Comp. Ex. 2 | 1.58 | 92.5 | 0.1 | C | 0.3-0.4 | B | C |
| Comp. Ex. 3 | 1.487 | 94.5 | 0.2 | B | 7 | B | C |
| Comp. Ex. 4 | 1.65 | 90.8 | 0.1 | A | 1.4 | B | C |
| Comp. Ex. 5 | 1.63 | 90.2 | 0.2 | A | 1 | B | C |
| Comp. Ex. 6 | 1.63 | 91.1 | 0.2 | A | 0.4 | B | C |

Example 2

Other than the fact that a cycloolefin polymer film ("Zeonor® ZF16" manufactured by Zeon Corporation, water absorbency: 0.01% or less, transmittance: 93.7%, haze: 0.1%, refractive index: 1.53) of a thickness of 100 μm is used as the protective layer, the same processes as in Example 1 are carried out, and a card sample B relating to Example 2 is obtained. "Zeonor® ZF16" has excellent solvent resistance as well.

In the same way as in Example 1, a data image is actually hologram-recorded on the obtained card sample B. When evaluation of the playback image is carried out, it is found that, in the same way as in Example 1, a clear Fourier image is played-back. Then, in the same way as in Example 1, after forced storage, a data image is hologram-recorded, and when the playback image is evaluated, it is found that, in the same way as in Example 1, a clear Fourier image is played-back.

Comparative Example 1

Other than the fact that a polyethylene terephthalate film ("Lumirror®" manufactured by Toray Industries, Inc., water absorbency: 0.3 to 0.4% or less, transmittance: 90.2%, haze: 1.7%, refractive index: 1.6) of a thickness of 100 μm is used as the protective layer, the same processes as in Example 1 are carried out, and a card sample C relating to Comparative Example 1 is obtained. The polyethylene terephthalate film has excellent solvent resistance as well.

In the same way as in Example 1, a data image is actually hologram-recorded on the obtained card sample C. When evaluation of the playback image is carried out, it is found that a somewhat blurry image is played-back.

Figure 7C:
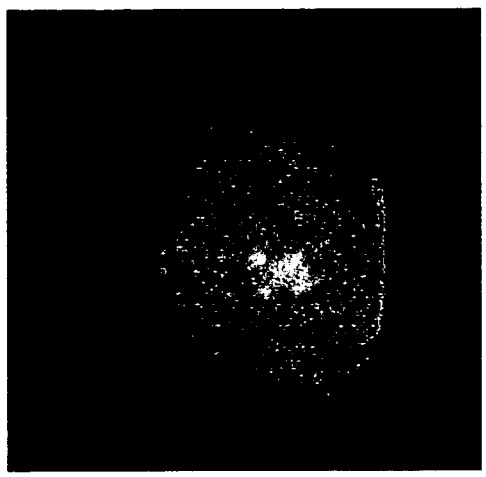

Then, in the same way as in Example 1, after forced storage, a data image is hologram-recorded, and the playback image is evaluated. The playback image detected at the CCD 44 is shown in FIG. 7C. As is clear from comparing FIG. 7C with FIG. 7B, with the card sample C, the playback image deteriorates extremely, and only a playback image which is insufficient to recognize the original image is obtained.

Comparative Example 2

Other than the fact that a polycarbonate film ("Pureace®" manufactured by Teijin Chemicals Ltd., water absorbency: 0.3 to 0.4% or less, transmittance: 92.5%, haze: 0.1%, refractive index: 1.58) of a thickness of 100 μm is used as the protective layer, the same processes as in Example 1 are carried out, and a card sample D relating to Comparative Example 2 is obtained. The haze of the polycarbonate film markedly increases due to the solvent.

In the same way as in Example 1, a data image is actually hologram-recorded on the obtained card sample D. When evaluation of the playback image is carried out, it is found that a somewhat blurry image is played-back.

Then, in the same way as in Example 1, after forced storage, a data image is hologram-recorded, and when the playback image is evaluated, it is found that, with the card sample D, the playback image deteriorates even more severely than FIG. 7C, and only a playback image which is insufficient to recognize the original image is obtained.

Comparative Example 3

Other than the fact that a tetraacetyl cellulose film ("Fujitac" manufactured by Fuji Photo Film Co., Ltd., water absorbency: 7% or less, transmittance: 94.5%, haze: 0.2%, refractive index: 1.487) of a thickness of 100 μm is used as the protective layer, the same processes as in Example 1 are carried out, and a card sample E relating to Comparative Example 3 is obtained. The haze of the tetraacetyl cellulose film markedly increases due to the solvent.

In the same way as in Example 1, a data image is actually hologram-recorded on the obtained card sample E. When evaluation of the playback image is carried out, it is found that a somewhat blurry image is played-back.

Then, in the same way as in Example 1, after forced storage, a data image is hologram-recorded, and when the playback image is evaluated, it is found that, with the card sample E, the playback image deteriorates even more severely than FIG. 7C, and only a playback image which is insufficient to recognize the original image is obtained.

Comparative Example 4

Other than the fact that a polyethersulphone film ("Sumilite FS1300" manufactured by Sumitomo Bakelite Co., Ltd., water absorbency: 1.4% or less, transmittance: 90.8%, haze: 0.1%, refractive index: 1.65) of a thickness of 100 μm is used as the protective layer, the same processes as in Example 1 are carried out, and a card sample F relating to Comparative Example 4 is obtained. The polyethersulphone film has excellent solvent resistance as well.

In the same way as in Example 1, a data image is actually hologram-recorded on the obtained card sample F. When evaluation of the playback image is carried out, it is found that a somewhat blurry image is played-back.

Then, in the same way as in Example 1, after forced storage, a data image is hologram-recorded, and when the playback image is evaluated, it is found that, with the card sample F, the playback image deteriorates extremely, and only a playback image which is insufficient to recognize the original image is obtained.

Comparative Example 5

Other than the fact that a polyetherimide film ("Sumilite FS1400" manufactured by Sumitomo Bakelite Co., Ltd., water absorbency: 1% or less, transmittance: 90.2%, haze: 0.2%, refractive index: 1.63) of a thickness of 100 μm is used as the protective layer, the same processes as in Example 1 are carried out, and a card sample G relating to Comparative Example 5 is obtained. The polyetherimide film has excellent solvent resistance as well.

In the same way as in Example 1, a data image is actually hologram-recorded on the obtained card sample G When evaluation of the playback image is carried out, it is found that a somewhat blurry image is played-back.

Then, in the same way as in Example 1, after forced storage, a data image is hologram-recorded, and when the playback image is evaluated, it is found that, with the card sample G, the playback image deteriorates extremely, and only a playback image which is insufficient to recognize the original image is obtained.

Comparative Example 6

Other than the fact that a polysulphone film ("Sumilite FS1200" manufactured by Sumitomo Bakelite Co., Ltd., water absorbency: 0.4% or less, transmittance: 91.1%, haze: 0.2%, refractive index: 1.63) of a thickness of 100 μm is used as the protective layer, the same processes as in Example 1 are carried out, and a card sample H relating to Comparative Example 6 is obtained. The polysulphone film has excellent solvent resistance as well.

In the same way as in Example 1, a data image is actually hologram-recorded on the obtained card sample H. When evaluation of the playback image is carried out, it is found that a somewhat blurry image is played-back.

Then, in the same way as in Example 1, after forced storage, a data image is hologram-recorded, and when the playback image is evaluated, it is found that, with the card sample H, the playback image deteriorates extremely, and only a playback image which is insufficient to recognize the original image is obtained.

As described above, with hologram cards using, at the protective layer, cycloolefin polymer films which have an excellent solvent resistance and a water absorbency of less than or equal to 0.01%, there is hardly any deterioration of the playback image before and after the forced storage, and clear Fourier images are played-back (Examples 1 and 2). On the other hand, with hologram cards using, at the protective layer, films whose water absorbencies are greater than 0.01%, the Fourier image played-back immediately after manufacturing of the sample also is somewhat blurred, and, after forced storage, only a playback image, which is unclear to the extent that the original image can not be recognized, can be obtained (Comparative Examples 1 through 6). Further, with hologram cards using, at the protective layer, films in which the haze increases due to the solvent contained in the photopolymer, the playback image deteriorates the most severely (Comparative Examples 2 and 3).

From the above, it can be understood that, by making the water absorbency of the protective layer less than or equal to 0.01%, the raw storability markedly improves, and even if the hologram recording medium is stored over a long period of time as is in an unrecorded state, a clear image can be obtained by recording/playback of a hologram.

As described above, the present invention has the effect of being able to provide a hologram recording medium having excellent raw storability.

What is claimed is:

1. A hologram recording medium comprising:
a non-optical-quality sheet member;
a recording layer at which a hologram can be recorded by illumination of writing light;
a reflecting layer provided between the sheet member and the recording layer, and due to illumination of reading light from a recording layer side, the reflecting layer reflecting the reading light and diffracted light diffracted by the hologram; and
a protective layer provided on the recording layer in order to protect the recording layer, a water absorbency of the protective layer being less than or equal to 0.001%, wherein a ten-point average roughness of a surface of the reflecting layer which surface contacts the recording layer is less than a wavelength of the reading light.

2. The hologram recording medium of claim 1, wherein the recording layer is structured of a hologram recording material formed from a photopolymer.

3. The hologram recording medium of claim 1, wherein haze of the protective layer is less than or equal to 3%.

4. The hologram recording medium of claim 1, wherein the protective layer is structured of a flexible resin film whose transmittance, with respect to the writing light and the reading light, is greater than or equal to 85%.

5. The hologram recording medium of claim 4, wherein haze of the flexible resin film is less than or equal to 3%.

6. The hologram recording medium of claim 4, wherein the flexible resin film is a cycloolefin polymer.

7. The hologram recording medium of claim 1, wherein a reflection preventing film is formed on an outer surface of the protective layer.

8. The hologram recording medium of claim 7, wherein the protective layer is a cycloolefin polymer.

9. The hologram recording medium of claim 1, wherein the ten-point average roughness is less than or equal to ½ of the wavelength of the reading light.

10. The hologram recording medium of claim 1, wherein the ten-point average roughness is less than a wavelength of the writing light.

11. The hologram recording medium of claim 1, wherein, when a wavelength of the reading light is 400 nm to 800 nm, the ten-point average roughness is less than or equal to 300 nm.

12. The hologram recording medium of claim 1, wherein the sheet member is one of paper and a plastic card.

13. The hologram recording medium of claim 1, wherein the sheet member further has an information recording portion at which information is recorded by a method different from the recording layer.

14. The hologram recording medium of claim 13, wherein a hologram, which is prepared on the basis of information recorded at the information recording portion, is recorded at the recording layer.

15. The hologram recording medium of claim 1, wherein the sheet member is an IC card in which an IC is embedded in a plastic card.

16. The hologram recording medium of claim 1, wherein the reflecting layer is structured of a light-reflecting material whose reflectance with respect to the writing light and the reading light is greater than or equal to 70%.

17. The hologram recording medium of claim 16, wherein the light-reflecting material is one of stainless steel, and one type of metal selected from the group consisting of Al, Ni, Cu, Ag, Au, and Cr.

18. The hologram recording medium of claim 1, wherein the reflecting layer is formed by affixing to the sheet member a resin film on which metal is deposited.

* * * * *